(12) United States Patent
Takechi et al.

(10) Patent No.: US 8,113,456 B2
(45) Date of Patent: Feb. 14, 2012

(54) DUAL-BEARING REEL SPEED-CHANGE OPERATION MECHANISM

(75) Inventors: Kunio Takechi, Osaka (JP); Takeshi Ikuta, Osaka (JP)

(73) Assignee: Shimano Inc., Osaka (JP)

( * ) Notice: Subject to any disclaimer, the term of this patent is extended or adjusted under 35 U.S.C. 154(b) by 121 days.

(21) Appl. No.: 12/793,143

(22) Filed: Jun. 3, 2010

(65) Prior Publication Data

US 2011/0011966 A1    Jan. 20, 2011

(30) Foreign Application Priority Data

Jul. 14, 2009  (JP) ................. 2009-165885

(51) Int. Cl.
    *A01K 89/01*    (2006.01)
(52) U.S. Cl. ......... 242/257; 242/255; 242/259; 242/263
(58) Field of Classification Search .................. 242/255, 242/257, 259, 263
    See application file for complete search history.

(56) References Cited

U.S. PATENT DOCUMENTS

| | | | | |
|---|---|---|---|---|
| 4,867,392 A * | 9/1989 | Sato | ............................. | 242/255 |
| 5,297,756 A * | 3/1994 | Ikuta | ............................. | 242/270 |
| 6,102,316 A * | 8/2000 | Nilsen | ............................. | 242/255 |
| 6,254,020 B1 * | 7/2001 | Nilsen | ............................. | 242/255 |
| 6,805,313 B2 * | 10/2004 | Nilsen | ............................. | 242/303 |
| 6,827,306 B1 * | 12/2004 | Datcuk, Jr. | ..................... | 242/303 |
| 7,234,661 B2 * | 6/2007 | Hirayama et al. | ............ | 242/303 |
| 7,278,599 B2 | 10/2007 | Alajajyan et al. | | |
| 7,559,499 B2 * | 7/2009 | Nakagawa et al. | ........... | 242/246 |

* cited by examiner

*Primary Examiner* — Emmanuel M Marcelo
(74) *Attorney, Agent, or Firm* — Global IP Counselors, LLP

(57) ABSTRACT

In a speed-change operation mechanism, a main body of a lock member is disposed to produce a clearance between the main body and the surface of the handle arm, whereas a pivot operation part of the lock member is disposed to close a clearance between the main body and the surface of the handle arm and simultaneously to produce a clearance between the pivot operation part and the surface of the handle arm. A relatively large clearance is produced between the main body of the lock member and the surface of the handle arm, whereas a small clearance, just enough to allow a pivot operation of the lock member, is produced between the pivot operation part and the surface of the handle arm.

8 Claims, 6 Drawing Sheets

DUAL-BEARING REEL SPEED-CHANGE OPERATION MECHANISM

CROSS-REFERENCE TO RELATED APPLICATIONS

This application claims priority to Japanese Patent Application No. 2009-165885 filed on Jul. 14, 2009, the entirety of which is hereby incorporated by reference.

BACKGROUND

1. Field of the Invention

The present invention generally relates to a speed-change operation mechanism, and more specifically, to a dual-bearing reel speed-change operation mechanism that is configured to deliver handle rotation to a spool while switching the handle rotation between high and low levels.

2. Background Information

Dual-bearing reels that include a rotation transmission mechanism for delivering handle rotation to a spool are well-known. The rotation transmission mechanism is provided with a speed-change mechanism configured to switch handle rotation between high-speed rotation and low-speed rotation. For example, the specification of U.S. Pat. No. 7,278,599 describes a dual-bearing reel of this type. In the foregoing speed-change mechanism, a high-speed gear with a large diameter and a low-speed gear with a small diameter are attached to the distal end of a handle shaft. Either the high-speed gear or the low-speed gear is selectively allowed to rotate unitarily with the handle shaft. Further, a small-diameter pinion gear and a large-diameter pinion gear are attached to the spool shaft and the spool while being unitarily rotatable with them. The small-diameter pinion gear is configured to be meshed with the high-speed gear, whereas the large-diameter pinion gear is configured to be meshed with the low-speed gear. Handle rotation, normally delivered to the high-speed gear via the handle shaft, is switched to be delivered to the low-speed gear via the handle shaft in conjunction with a press operation of an operation shaft. Specifically, handle rotation is delivered to the low-speed gear via the handle shaft when the operation shaft is inwardly pressed. Further, handle rotation is delivered to the large-diameter pinion gear via the low-speed gear. Accordingly, the spool shaft and the spool rotate at low speed. On the other hand, handle rotation is delivered to the high-speed gear via the handle shaft when the operation shaft is outwardly pulled in conjunction with a moving operation for moving a lock member, disposed on the handle arm in a movable state, in a direction away from an interlock groove formed on the operation shaft. Handle rotation is further delivered to the small-diameter pinion gear via the high-speed gear. Accordingly, the spool shaft and the spool rotate at high-speed.

In the foregoing speed-change operation mechanism, the operation shaft is configured to be outwardly pulled in conjunction with the moving operation for moving the lock member, which is disposed on the handle arm in a movable state, in the direction away from the interlock groove formed on the operation shaft. The lock member includes a lock plate and an operation knob. First, the lock plate is a plate-shaped member disposed on the handle arm. The lock plate includes an interlock portion in its base end. The interlock portion is configured to be interlocked with the interlock groove formed on the operation shaft. On the other hand, the operation knob is attached to the tip of the lock plate. An angler holds and moves the operation knob with his/her fingers. The lock plate and the operation knob are separated from the handle arm by a slight clearance. The lock plate and the operation knob are configured to move while the entirety of their surfaces opposed to the handle arm is positioned close to the handle arm.

In the well-known foregoing speed-change operation mechanism, the lock plate and the operation knob are separated from the handle arm by a clearance. Further, the lock plate and the operation knob are configured to move while the entirety of their surfaces opposed to the handle arm is positioned close to the handle arm. Therefore, the lock plate and the operation knob may be immovable when a fishing line gets stuck in the clearance between the handle arm and both the lock plate and the operation knob. Further, the clearance is produced between the handle arm and the entirety of the surfaces, opposed to the handle arm, of the lock plate and the operation knob. Therefore, a smooth moving operation of the lock plate and the operation knob may be disturbed when the lock plate and the operation knob are flexed or deformed towards the handle arm.

In view of the above, it will be apparent to those skilled in the art from this disclosure that there exists a need for an improved dual-bearing reel speed-change operation mechanism for achieving a smooth operation of the lock plate and the operation knob. This invention addresses this need in the art as well as other needs, which will become apparent to those skilled in the art from this disclosure.

SUMMARY

A dual-bearing reel speed-change operation mechanism according to a first aspect is configured to switch handle rotation between high-speed rotation and low-speed rotation for delivering or transmitting the handle rotation to a spool. The dual-bearing reel speed-change operation mechanism includes a handle, a handle shaft, an operation shaft, an operation shaft urging member, a lock member, and a lock member urging member. The handle includes a handle arm and a handle knob. The handle arm has a first through hole formed in a direction perpendicular to a longitudinal direction thereof. The handle knob is attached to a distal end of the handle arm. The handle shaft includes a base end attached into the first through hole of the handle arm while being unitarily rotatable with the handle arm. Further, the handle shaft includes a second through hole axially passing through the inside of the handle shaft. The operation shaft includes a shaft portion and a press operation portion. The shaft portion is inserted through the second through hole of the handle shaft. The shaft portion has an interlock-target portion on an outer periphery of a base end thereof. The press operation portion is formed on the base end of the shaft portion. The press operation portion has a large diameter. The press operation portion is configured to switch the handle rotation from the high-speed rotation down to the low-speed rotation through a press operation. The operation shaft urging member is configured to urge the operation shaft in an axially outward direction. The lock member includes a main body, a pivot shaft, and a pivot operation part. The main body is disposed to produce a clearance between the main body and a surface of the handle arm. The main body has an interlock portion on a lateral part thereof. The interlock portion is herein configured to be interlocked with the interlock target portion of the shaft portion of the operation shaft. The pivot shaft is provided to the main body in an upwardly raised position perpendicular to the handle arm. The pivot shaft is configured to pivot the interlock portion between a direction to interlock the interlock portion with the interlock-target portion and a direction to release the interlock portion from the interlocked state with the interlock-target portion. The pivot operation part is disposed to close the clearance between the main body and the surface of the handle arm and simultaneously to produce a clearance between the pivot operation part and the surface of the handle arm. The lock member urging member is configured to urge the lock member towards the operation shaft.

According to the dual-bearing reel speed-change operation mechanism of the first aspect, the main body of the lock member is disposed to produce the clearance between the main body and the surface of the handle arm. On the other hand, the pivot operation part of the lock member is disposed to close the clearance between the main body and the surface of the handle arm and simultaneously to produce the clearance between the pivot operation part and the surface of the handle arm. In this case, a large clearance is produced between the main body (i.e., lock plate) of the lock member and the surface of the handle arm, whereas a small clearance, just enough to allow a pivot operation, is produced between the pivot operation part (i.e., operation knob) of the lock member and the surface of the handle arm. Further, the pivot operation part of the lock member is disposed close to the surface of the handle arm. Therefore, the clearance, herein produced between the pivot operation part and the surface of the handle arm, will be smaller than the clearance produced between the handle arm and the entire surface of the section including the lock plate and the operation knob in the well-known structure. This structure can prevent the fishing line from easily getting stuck in the small clearance between the pivot operation part of the lock member and the surface of the handle arm. Further, the pivot operation part is disposed close to the surface of the handle arm. Therefore, even if a large force acts on the main body and the pivot operation part of the lock member in the direction of the handle arm, the pivot operation part makes contact with the surface of the handle arm and accordingly the main body of the lock member is prevented from being flexed and deformed. Thus, the foregoing structure can prevent the fishing line from easily getting stuck in the space between the pivot operation part of the lock member and the surface of the handle arm, and simultaneously prevent deformation of the main body and the pivot operation part of the lock member. Consequently, a smooth pivot operation is achieved for the main body and the pivot operation part of the lock member.

A dual-bearing reel speed-change operation mechanism according to a second aspect relates to the dual-bearing reel speed-change operation mechanism according to the first aspect, and further includes a base member on which the pivot shaft of the lock member is mounted and both the main body of the lock member and the lock member urging member are disposed on the front side thereof in a pivotable state. According to this dual-bearing reel speed-change operation mechanism, a large clearance is produced between the handle arm and the main body of the lock member by disposing the base member on the handle arm. However, deformation of the main body and the pivot operation part of the lock member can be prevented by the base member. Further, a small clearance is produced between the pivot operation part of the lock member and the surface of the handle arm. Therefore, the structure prevents the fishing line from easily getting stuck in the clearance between the pivot operation part of the lock member and the surface of the handle arm. Consequently, an advantageous effect can be remarkably achieved in which a smooth pivot operation is possible for the main body and the pivot operation part of the lock member.

A dual-bearing reel speed-change operation mechanism according to a third aspect relates to the dual-bearing reel speed-change operation mechanism according to one of the first or second aspects, wherein the pivot operation part is disposed along the surface of the handle arm in a pivotable state. According to this dual-bearing reel speed-change operation mechanism, the pivot operation part is configured to pivot along and only within or over the surface of the handle arm. In other words, the pivot operation part does not stick out of or protrude from the outline of the handle arm. The fishing line does not thereby easily get stuck in the pivot operation part.

A dual-bearing reel speed-change operation mechanism according to a fourth aspect relates to the dual-bearing reel speed-change operation mechanism according to the third aspect, wherein the pivot operation part has a roughly circular outline and an outer periphery of the pivot operation part is knurled. According to this dual-bearing reel speed-change operation mechanism, the outer periphery of the pivot operation part is knurled. Therefore, skid resistant or skid free easy-handling is achieved for the pivot operation part even when the pivot operation part is disposed along the surface of the handle arm.

A dual-bearing reel speed-change operation mechanism according to a fifth aspect relates to the dual-bearing reel speed-change operation mechanism according to one of the first to fourth aspects, wherein the pivot operation part includes a first pivot operation portion and a second pivot operation portion. The first pivot operation portion is disposed on the front side of the main body, whereas the second pivot operation portion is disposed on the back side of the main body for closing the clearance between the main body and the surface of the handle arm. According to this dual-bearing reel speed-change operation mechanism, the pivot operation part has a two-piece structure composed of the first and second pivot operation portions. Therefore, minute designing is possible for the second pivot operation portion. Accordingly, the clearance can be further reduced between the second pivot operation portion and the surface of the handle arm.

A dual-bearing reel speed-change operation mechanism according to a sixth aspect relates to the dual-bearing reel speed-change operation mechanism according to the fifth aspect, wherein the main body includes a third through hole passing through the distal end thereof. Further, the first pivot operation portion includes a shaft portion passing through the third through hole of the main body. The second pivot operation portion includes a recess in which the distal end of the shaft portion of the first pivot operation portion is inserted and fixed therein by caulking. According to this dual-bearing reel speed-change operation mechanism, the first pivot operation portion is fixed to the second pivot operation portion by caulking. The first pivot operation portion can be thereby easily fixed to the second pivot operation portion. Further, the caulking-fixed portion between the first and second pivot operation portions is disposed on the handle arm side without being exposed to the outside. Therefore, the fishing line does not easily get stuck in the caulking-fixed portion.

A dual-bearing reel speed-change operation mechanism according to a seventh aspect relates to the dual-bearing reel speed-change operation mechanism according to one of the first to sixth aspects, wherein the interlock-target portion is an interlock groove formed on the outer periphery of the shaft portion. Further, the interlock portion is a curved portion curved in a circular-arc shape for interlocking with the interlock groove. According to the dual-bearing reel speed-change operation mechanism, the curved portion curved in a circular-arc shape is interlocked with the interlock groove formed on the outer periphery of the shaft portion. The structure can reduce a pivot range of the main body of the lock member.

A dual-bearing reel speed-change operation mechanism according to an eighth aspect relates to the dual-bearing reel speed-change operation mechanism according to one of the second to seventh aspects, and further includes a casing member fixed on the surface of the handle arm. The casing member covers the operation shaft, the lock member, the lock member urging member, and the base member in a condition such that the press operation portion and the pivot operation part are exposed to the outside. According to this dual-bearing reel speed-change operation mechanism, the cover member is provided to cover a relatively complex mechanism composed of the operation shaft, the lock member, the lock member urging member, and the base member. Therefore, the cover member prevents the fishing line from easily getting stuck in the mechanism.

According to a dual-bearing reel speed-change operation mechanism described herein, the main body of the lock member is disposed to produce a clearance between the main body and the surface of handle arm. Further, the pivot operation part of the lock member is disposed to close the clearance between the main body and the surface of the handle arm and simultaneously to produce the clearance between the pivot operation part and the surface of the handle arm. The structure can prevent the fishing line from easily getting stuck in the space between the pivot operation part of the lock member and the surface of the handle arm. Further, the structure can prevent deformation of the main body and the pivot operation part of the lock member. Consequently, a smooth pivot operation is achieved for the main body of the lock member and the pivot operation part.

These and other objects, features, aspects, and advantages of the present invention will become apparent to those skilled in the art from the following detailed description, which, taken in conjunction with the annexed drawings, discloses exemplary embodiments of the present invention.

BRIEF DESCRIPTION OF THE DRAWINGS

Referring now to the attached drawings which form a part of this original disclosure.

DETAILED DESCRIPTION OF THE EXEMPLARY EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
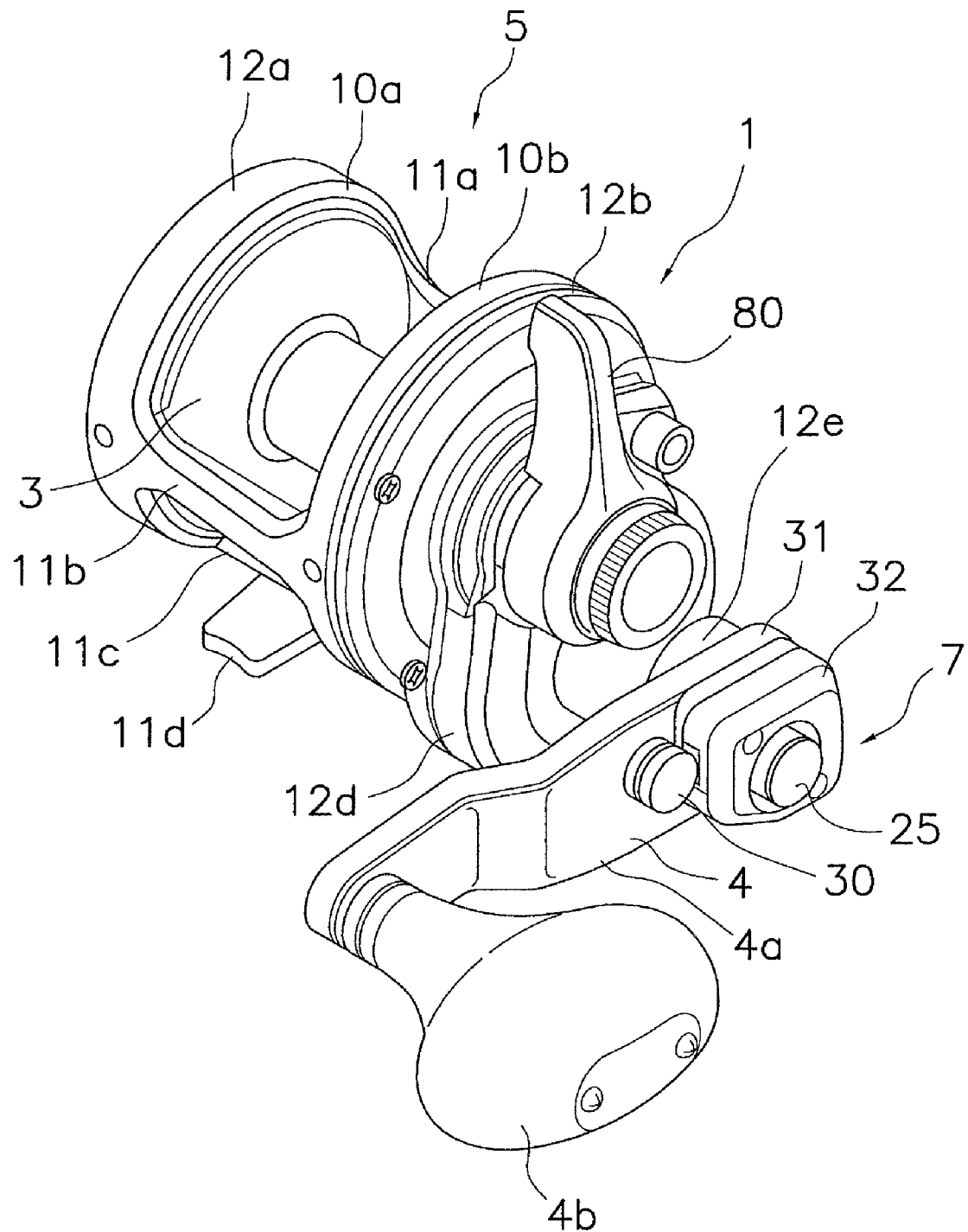
FIG. 1 is a perspective view of a dual-bearing reel according to an exemplary embodiment.
Figure 2:
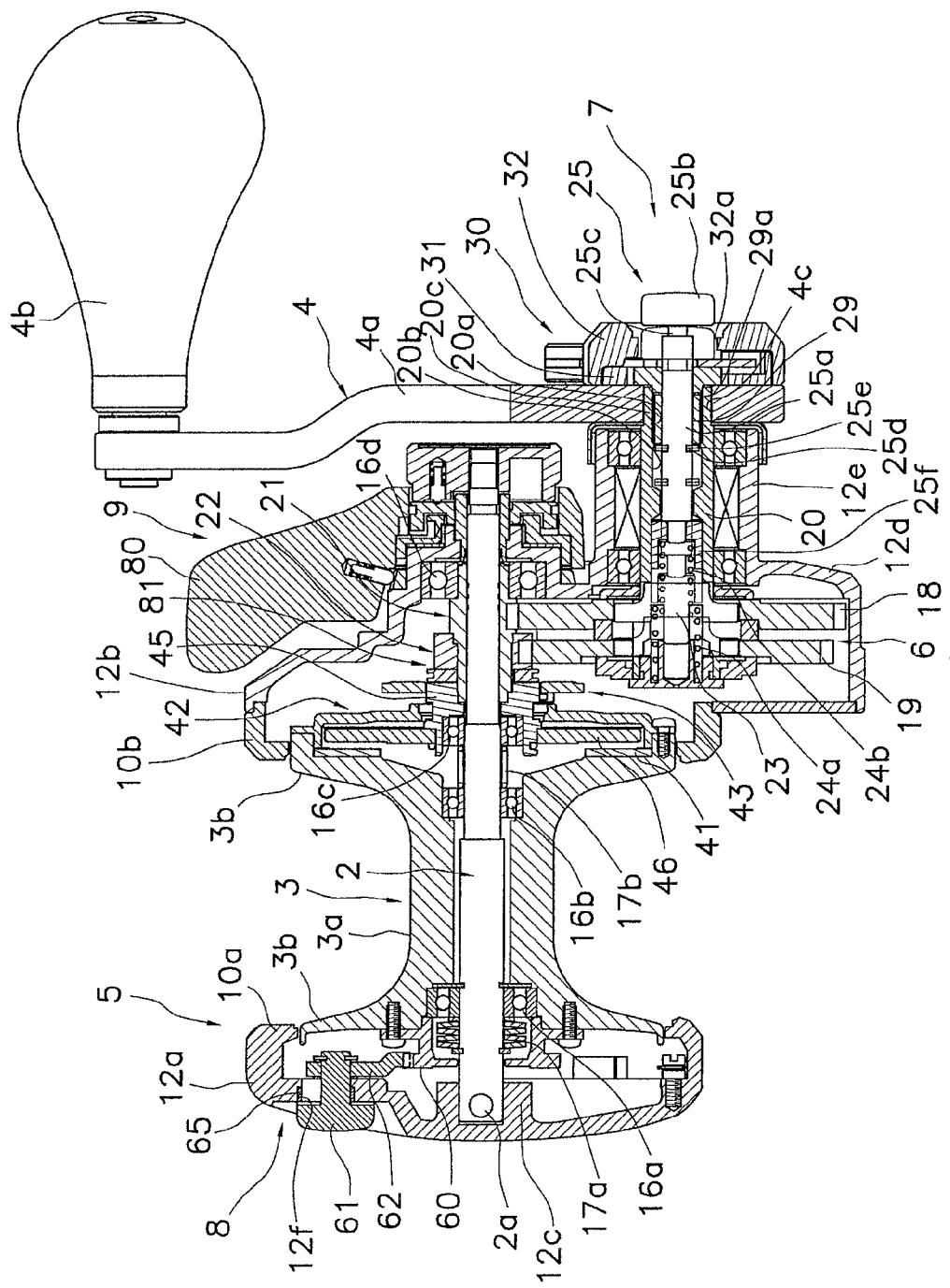
FIG. 2 is a cross-sectional view of the dual-bearing reel.

As illustrated in FIGS. 1 and 2, a dual-bearing reel according to an exemplary embodiment is a medium-sized lever drag reel. The lever drag reel includes a tubular reel body 1, a spool shaft 2, a spool 3, and a handle 4. The spool shaft 2 is attached to the center part of the reel body 1 while being prevented from rotating and allowed to move axially. The spool 3 is supported by the spool shaft 2 while being allowed to rotate and prevented from axially moving. The handle 4 is disposed lateral to the reel body 1. As illustrated in FIG. 2, the lever drag reel further includes a rotation transmission mechanism 6 and a lever drag mechanism 9 in the interior of the reel body 1. The rotation transmission mechanism 6 is configured to deliver rotation of the handle 4 to the spool 3. The lever drag mechanism 9 is configured to brake rotation of the spool 3 in a fishing line release direction.

As illustrated in FIGS. 1 and 2, the reel body 1 includes a metal frame 5 composed of a pair of a first side plate 10a and a second side plate 10b, coupling portions 11a, 11b, and 11c, and a first cover member 12a. The first and second side plates 10a and 10b are a pair of right and left saucer-shaped metal plates. The coupling portions 11a, 11b, and 11c couple the first side plate 10a and the second side plate 10b at the front, the rear, and the bottom of the frame 5. The first cover member 12a is integrally formed with the first side plate 10a to cover the outside of the first side plate 10a. As illustrated in FIG. 2, the first cover member 12a includes an elongated aperture 12f in an upper right portion of its lateral part, seen from the left side of FIG. 2. The elongated aperture 12f passes through the lateral part of the first cover member 12a and has a roughly oval outline.

The coupling portion 11c of the frame 5 includes a fishing-rod attachment portion 11d for attaching the lever drag reel to a fishing rod. The fishing-rod attachment portion 11d is integrally formed with the coupling portion 11c. The first and second side plates 10a and 10b, the coupling portions 11a, 11b, and 11c, and the first cover member 12a are integrally formed by metal cutting work, and can be a unitary member.

As illustrated in FIGS. 1 and 2, the reel body 1 includes a second cover member 12b made of metal. The second cover member 12b covers the outside, i.e., the side facing the handle 4 of the second side plate 10b. Further, each of the first and second side plates 10a and 10b includes an opening for allowing the spool 3 to pass through. The first cover member 12a includes a boss portion 12c in its interior. The boss portion 12c supports the left distal end of the spool shaft 2 while preventing the spool shaft 2 from rotating and allowing it to move axially. As illustrated in FIG. 2, the first cover member 12a contains a spool sound producing mechanism 8 in its interior. The spool sound producing mechanism 8 is configured to produce sound in conjunction with rotation of the spool 3.

As illustrated in FIG. 2, the spool sound producing mechanism 8 is configured to produce sound in conjunction with rotation of the spool 3. Further, the spool sound producing mechanism 8 can be switched between a sound productive state and a sound nonproductive state to prevent the spool sound producing mechanism 8 from producing sound. As illustrated in FIG. 2, the spool sound producing mechanism 8 includes a convexo-concave member 60, an operation member 61, a sound producing member 62, an urging member (not illustrated in the figure), and a collar member 65. The convexo-concave member 60 is configured to rotate in conjunction with the spool 3. The operation member 61 is attached to the convexo-concave member 60 while being movable in both a direction away from the convexo-concave member 60 and a direction toward the convexo-concave member 60. The sound producing member 62 is attached to the operation member 61 in a pivotable state. The urging member urges the sound producing member 62 towards the convexo-concave member 60. The collar member 65 is an elastic member attached to the elongated aperture 12f of the first cover member 12a to position the operation member 61 in either a sound productive position or a sound nonproductive position.

As illustrated in FIGS. 1 and 2, the second cover member 12b, disposed on the same side as the handle 4, has a bulged portion 12d. The bulged portion 12d protrudes in both a radial direction and an axial outward direction. As illustrated in FIG. 2, the bulged portion 12d contains the rotation transmission mechanism 6 in its interior. Further, the second cover member 12b has a support tubular portion 12e in the lower part of the bulged portion 12d. The support tubular portion 12e protrudes in an axial outward direction parallel to or substantially parallel to the spool shaft 12, and supports a handle shaft 20 of the handle 4.

As illustrated in FIG. 2, the spool shaft 2 is supported by the boss portion 12c of the first cover member 12a and the second cover member 12b while being prevented from rotating and allowed to move axially. The spool shaft 2 is provided with an anti-rotation pin 2a. Specifically, the anti-rotation pin 2a is attached to the left distal end of the spool shaft 2 while passing through the spool shaft 2 in a radial direction. On the other hand, the boss portion 12c of the first cover member 12a has an anti-rotation slit (not illustrated in the figure) to be engaged with the anti-rotation pin 2a. The anti-rotation slit is formed along a radial direction of the boss portion 12c.

The spool shaft 2 supports the spool 3 in a rotatable state through first and second bearings 16a and 16b disposed on the outer periphery of the spool shaft 2. The first bearing 16a is urged in an axial inward direction (i.e., rightward in FIG. 2) by a first spring member 17a, which can be a disc-spring type. On the other hand, the second bearing 16b is urged in an axial inward direction (i.e., leftward in FIG. 2) by a second spring member 17b, which can be a coil-spring type. Further, the axial inward surfaces of the first and second bearings 16a and 16b are prevented from inwardly moving by the spool 3 and the spool shaft 2. This structure enables the spool shaft 2 and the spool 3 to move unitarily in the axial direction. The spool shaft 2 is axially moved with the spool 3 by the lever drag mechanism 9.

As illustrated in FIG. 2, the spool 3 includes a bobbin trunk 3a and a pair of flanges 3b integrally formed on the both edges of the bobbin trunk 3a. In addition, a friction disc 41 is fixed to the end surface of the right-side flange 3b by a screw. The friction disc 41 forms a part of the lever drag mechanism 9.

As illustrated in FIG. 2, the handle 4 is secured to the protruded end of the tubular handle shaft 20 disposed below and in parallel to the spool shaft 2. The handle shaft 20 is supported by the reel body 1 in a rotatable state. As illustrated in FIG. 2, the handle shaft 20 has a through hole 20b (second through hole) axially passing through its inside.

As illustrated in FIG. 2, the rotation transmission mechanism 6 includes a speed-change operation mechanism 7. The speed-change operation mechanism 7 is configured to switch handle rotation between a high-speed level and a low-speed level. As illustrated in FIG. 2, the speed-change operation mechanism 7 includes a first main gear 18, a second main gear 19, a first pinion gear 21, a second pinion gear 22, an engaging piece 23, a first compression spring 24a, a second compression spring 24b, and an operation shaft 25. The first main gear 18 and the second main gear 19 are respectively supported by the handle shaft 20 of the handle 4 in a rotatable state. The first main gear 18 is used for winding the fishing line at high speed, whereas the second main gear 19 is used for winding the fishing line at low speed. The first pinion gear 21 and the second pinion gear 22 are respectively attached to the spool shaft 2 in a rotatable state. Simultaneously, the first pinion gear 21 is meshed with the first main gear 18, whereas the second pinion gear 22 is meshed with the second main gear 19. The engaging piece 23 couples either the first main gear 18 or the second main gear 19 to the handle shaft 20. Accordingly, handle rotation is delivered to the coupled one of the first main gear 18 and the second main gear 19 via the handle shaft 20. The first compression spring 24a (an example of an operation shaft urging member) is disposed on the left side of the engaging piece 23 in FIG. 2. The first compression spring 24a urges the operation shaft 25 in an axial outward direction (i.e., rightward in FIG. 2) through the engaging piece 23 and the second compression spring 24b. The second compression spring 24b is disposed on the right side of the engaging piece 23 in FIG. 2. The second compression spring 24b urges the engaging piece 23 towards the second main gear 19. The operation shaft 25 sets the engaging piece 23 to be in either a high-speed position or a low-speed position. The engaging piece 23 is engaged with the first main gear 18 in the high-speed position, whereas the engaging piece 23 is engaged with the second main gear 19 in the low-speed position. In FIG. 2, the engaging piece 23 set to be in the high-speed position is depicted with a solid line, whereas the engaging piece 23 set to be in the low-speed position is depicted with a dashed two-dotted line.

As illustrated in FIG. 2, the first pinion gear 21 is a tubular member. The first pinion gear 21 is made of anti-corrosive metal (e.g., non-magnetic stainless alloy). The right end of the first pinion gear 21 is supported by a fourth bearing 16d in a rotatable state. The fourth bearing 16d is attached to the bulged portion 12d while being disposed about the spool shaft 2. On the other hand, the left end of the first pinion gear 21 is engaged with a drag disc 42 of the lever drag mechanism 9 while being unitarily rotatable with it. The second pinion gear 22 is a tubular member made of the same material as the first pinion gear 21. The left end of the second pinion gear 22 is engaged with the drag disc 42 while being unitarily rotatable with it. The engaging piece 23 is disposed within a slit of the handle shaft 20 in a non-rotatable state. As illustrated in FIG. 2, the operation shaft 25 is inserted through the through hole 20b of the handle shaft 20. In FIG. 2, the right end of the operation shaft 25 protrudes in an axial outward direction of a handle arm 4a (i.e., rightward in FIG. 2). The operation shaft 25 can be thereby pressed leftward in FIG. 2. The operation shaft 25 is supported by a nut member 29 while being axially movable. The nut member 29 is screwed into the protruded end of the handle shaft 20 for securing the handle 4 to the handle shaft 20.

Figure 3:
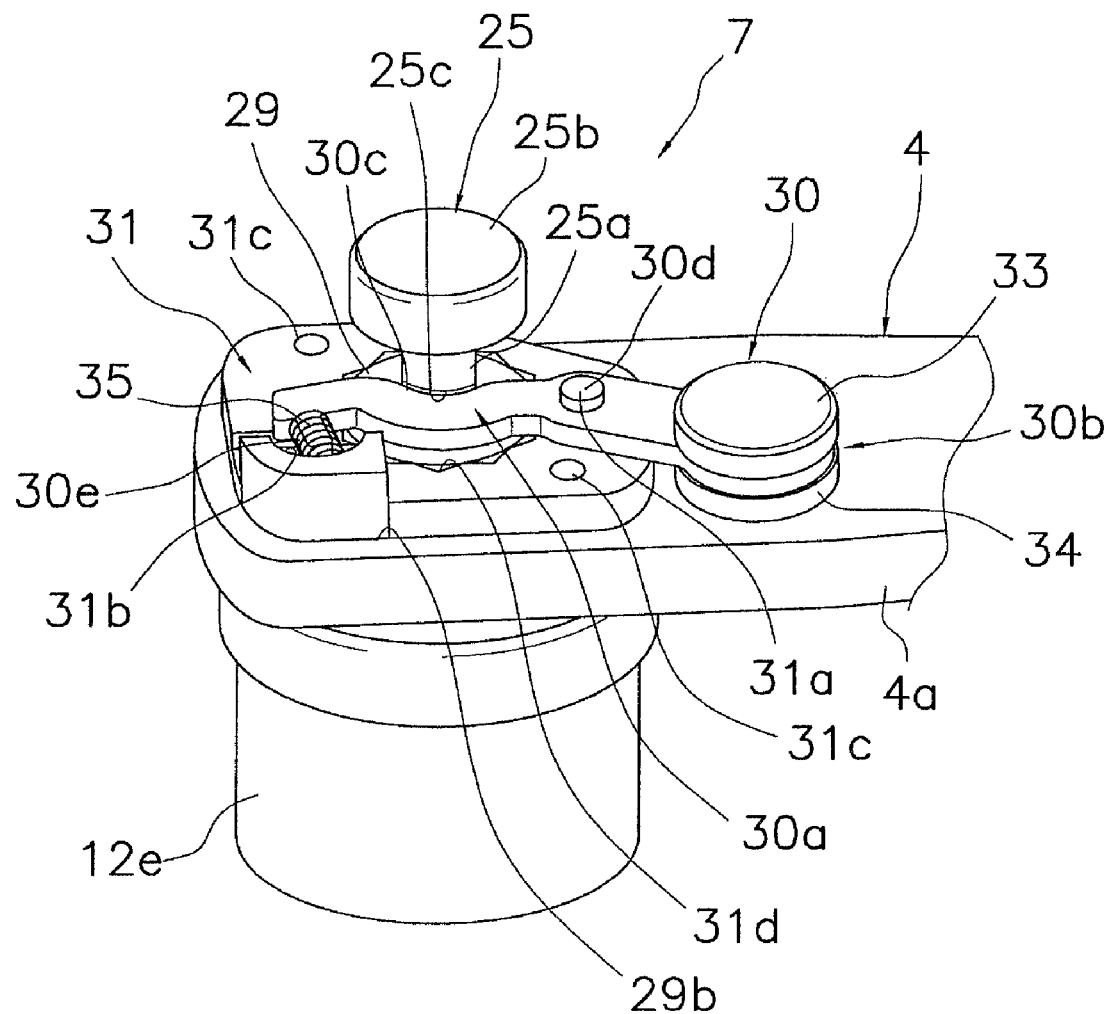
FIG. 3 is a perspective view of a speed-change operation mechanism of the dual-bearing reel and its periphery.
Figure 4:
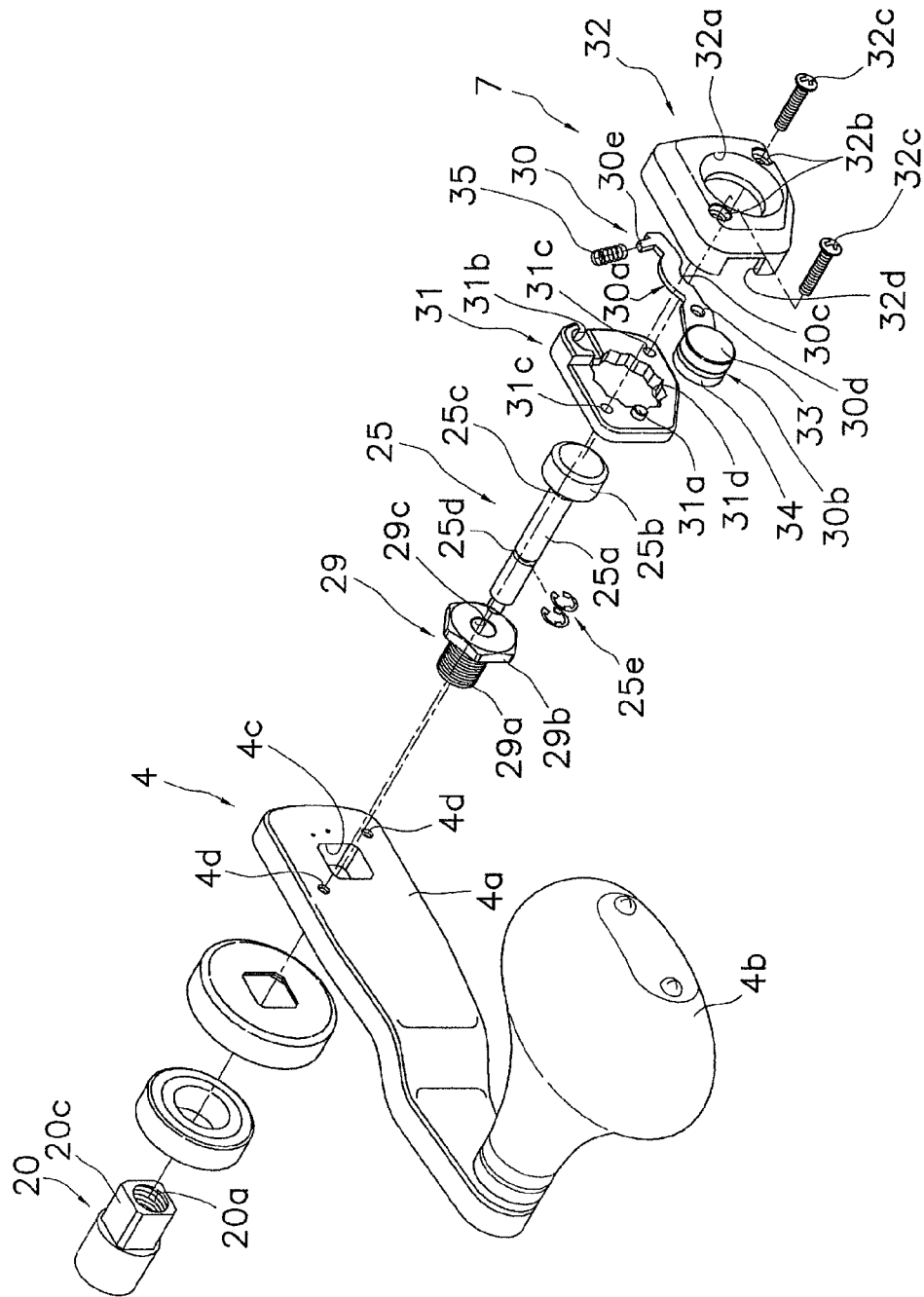
FIG. 4 is an exploded perspective view of the speed-change operation mechanism and its periphery.

As illustrated in FIGS. 2 to 4, the speed-change operation mechanism 7 includes the handle 4, the handle shaft 20 including the nut member 29, the first compression spring 24a (an example of the operation shaft urging member), the operation shaft 25, a lock member 30, a spring member 35 functioning as a lock member urging member, a base member 31, and a casing member 32.

As illustrated in FIGS. 2 and 4, the handle 4 includes the handle arm 4a and a handle knob 4b. The handle arm 4a includes a through hole 4c (first through hole) formed to extend in a direction perpendicular to the longitudinal direction of the handle arm 4a. The through hole 4c is formed on a proximal end of the handle arm 4a. The handle knob 4b is attached to the distal end of the handle arm 4a in a rotatable state. Specifically, the handle arm 4a is a plate-shaped member made of metal. The handle arm 4a includes the through hole 4c with a non-circular outline in its base end. The nut member 29, forming a part of the handle shaft 20, is attached to the through hole 4c while being unitarily rotatable with the handle 4. As illustrated in FIGS. 2 and 4, the base end 20c of the handle shaft 20 includes a female threaded portion 20a on the inner periphery of the through hole 20b. A male threaded portion 29a of the nut member 29 is screwed into the female threaded portion 20a. Accordingly, the handle shaft 20 and the nut member 29 are unitarily rotatable. The nut member 29 includes a head portion 29b with a hexagonal outline. The head portion 29b is engaged with a noncircular hole 31d of the base member 31 to be fixed to the handle arm 4a described below. The head portion 29b is herein prevented from rotating relative to the base member 31. The nut member 29 includes a through hole 29c in its center part. The through hole 29c allows a shaft portion 25a of the operation shaft 25 described below to be movably inserted therethrough. Further, the handle arm 4a includes two female threaded holes 4d in two positions around the through hole 4c. The female threaded holes 4d allow two screw members 32c to be screwed therein for fixing the base member 31 and the casing member 32 to the handle arm 4a.

As illustrated in FIGS. 2 to 4, the operation shaft 25 is a bolt-shaped shaft member allowed to be inserted through the through hole 4c of the handle arm 4a. The operation shaft 25 includes the shaft portion 25a and a press operation portion 25b. The press operation portion 25b has a diameter greater than that of the shaft portion 25a. As illustrated in FIG. 2, the front end of the shaft portion 25a (i.e., the left distal end of the shaft portion 25a in FIG. 2) is disposed for pressing the engaging piece 23 towards the second main gear 19 through the second compression spring 24b. On the other hand, the base end of the shaft portion 25a (i.e., the right distal end of the shaft portion 25a in FIG. 2) has an interlock target portion 25c on its outer periphery. The interlock target portion 25c is an interlock groove formed on the outer periphery of the shaft portion 25a. An interlock portion 30c described below (i.e., a curved portion of the lock member 30) is configured to be interlocked with the interlock target portion 25c. As illustrated in FIGS. 2 and 4, the shaft portion 25a has an annular groove 25d on the axial center part of its outer periphery. Two E-shaped retainer rings 25e are attached to the annular groove 25d to prevent the operation shaft 25 from being detached from the handle shaft 20 to the outward of the handle arm 4a. The press operation portion 25b is a circular press operation button for switching the handle rotation between the high-speed rotation and the low-speed rotation in response to a press operation of an angler. The press operation portion 25b is formed on the base end (i.e., right end in FIG. 2) of the shaft portion 25a and has a large diameter relative to that of the shaft portion 25a. A spring holder 25f is fixed to the front end of the shaft portion 25a. The spring holder 25f is arranged so as to contact the base end of the second compression spring 24b. The engaging piece 23 is arranged so as to contact the front end of the second compression spring 24b. Since the second compression spring 24b is arranged in a way that it is compressed between the spring holder 25f and the engaging piece 23, the second compression spring 24b is disposed for pressing the spring holder 25f towards the shaft portion 25a, and the second compression spring 24b is disposed for pressing the engaging piece 23f towards the second main gear 19. Here, when the shaft portion 25a moves to the left in FIG. 2, the engaging piece 23 moved to the left in FIG. 2 by the spring holder 25f pressing the second compression spring 24b to the left in FIG. 2 and the second compression spring 24b pressing the engaging piece 23 to the left in FIG. 2. When the engaging piece 23 moves to the left in FIG. 2, the engaging piece 23 is detached from the first main gear 18 and engages with the second main gear 19.

As illustrated in FIGS. 2 to 6, the lock member 30 includes a main body 30a, a pivot shaft 31a, and a pivot shaft operation part 30b. The main body 30a is a plate-shaped member that is configured to extend perpendicular or substantially perpendicular to the shaft portion 25a. The pivot shaft 31a is raised upright on the base member 31. In other words, the pivot shaft 31a extends in a direction parallel or substantially parallel to the shaft portion 25a. The pivot shaft 31a is fitted into a pivot shaft hole 30d that passes through the center part of the main body 30a. The pivot shaft operation part 30b is provided on the tip of the main body 30a.

As illustrated in FIG. 3, the main body 30a is disposed to produce a clearance between the main body 30a and the surface of the handle arm 4a. The main body 30a includes the interlock portion 30c on its lateral part. The interlock portion 30c is configured to be interlocked with the interlock target portion 25c. A large clearance is produced between the main body 30a and the surface of the handle arm 4a, whereas a relatively small clearance is produced between the pivot operation part 30b described below and the surface of the handle arm 4a. The interlock portion 30c is a curved portion curved in a circular-arc shape to interlock with the interlock target portion 25c. The main body 30a includes a holding portion 30e that protrudes from the lateral side of an end of the main body (i.e. base end) in a direction perpendicular or substantially perpendicular to the direction in which the pivot shaft 31a protrudes. One end of the spring member 35 functioning as the lock member urging member is attached onto the holding portion 30e. As illustrated in FIG. 3, the spring member 35 is a coil spring for urging the lock member 30 towards the operation shaft 25. The spring member 35 is disposed in a compressed state while the other end thereof can make contact with an adjoining portion 31b (i.e., a wall portion of the base member 31) that has a surface that extends in a direction parallel or substantially parallel to the direction in which the pivot shaft 31a protrudes.

As illustrated in FIG. 3, the pivot operation part 30b is provided for closing the clearance between the main body 30a and the surface of the handle arm 4a and simultaneously for producing the clearance between the pivot operation part 30b and the surface of the handle arm 4a. The pivot operation part 30b has a roughly circular outline. The pivot operation part 30b has a knurled outer periphery. This structure realizes an easy pivot operation of the pivot operation part 30b. Quite a small clearance, just enough to allow a pivot operation of the pivot operation part 30b, is produced between the pivot operation part 30b and the surface of the handle arm 4a. For example, the distance of the small clearance between the pivot shaft operation 30b and the surface of the handle arm 4a is not less than 0.3 mm but not more than 1 mm. When the distance between the pivot shaft operation 30b and the surface of the handle arm 4a is less than 0.3 mm, a fishing line with a diameter of 0.3 mm to 0.35 mm, which is most commonly used for the fishing reel of this kind gets caught in the small clearance between the pivot shaft operation 30b and the surface of the handle arm 4a (the fishing line is compressed and pressed into the small clearance), thus possibly impairing the pivotal movement of the pivot shaft operation 30b. On the other hand, when the distance between the pivot shaft operation 30b and the surface of the handle arm 4a is greater than 1 mm, the fishing line might tangle around the pivot shaft operation 30b. If a great force is applied to the pivot shaft operation 30b when the reel is dropped or when it comes into contact with something, inelastic deformation might occur on the main body 30a before the handle arm 4a contacts the pivot shaft operation 30b. Note, however, that the numerical example here is not limited thereto, but may be modified as necessary taking the diameter of the fishing line usually used for the reel, the strength (the elastic limit) of the main body 30a and so forth into account. The distance of the large clearance between the main body 30a and the surface of handle arm 4a is substantially equal to the distance between the surface of the base member 31 and the surface of the handle arm 4a. Alternatively, the distance between the surface of the second pivot operation portion 34 facing a surface of the handle arm 4a and the surface of the handle arm 4a is the thickness of the base member 31 from the surface contacting the handle arm 4a to the surface contacting the main body 30a.

As illustrated in FIG. 3, the pivot operation part 30b is disposed along the surface of the handle arm 4a in a pivotable state. The pivot operation part 30b herein does not stick out of or protrude from the outline of the handle arm 4a in a direction perpendicular or substantially perpendicular to the direction in which the pivot shaft 31a protrudes.

Figure 5:
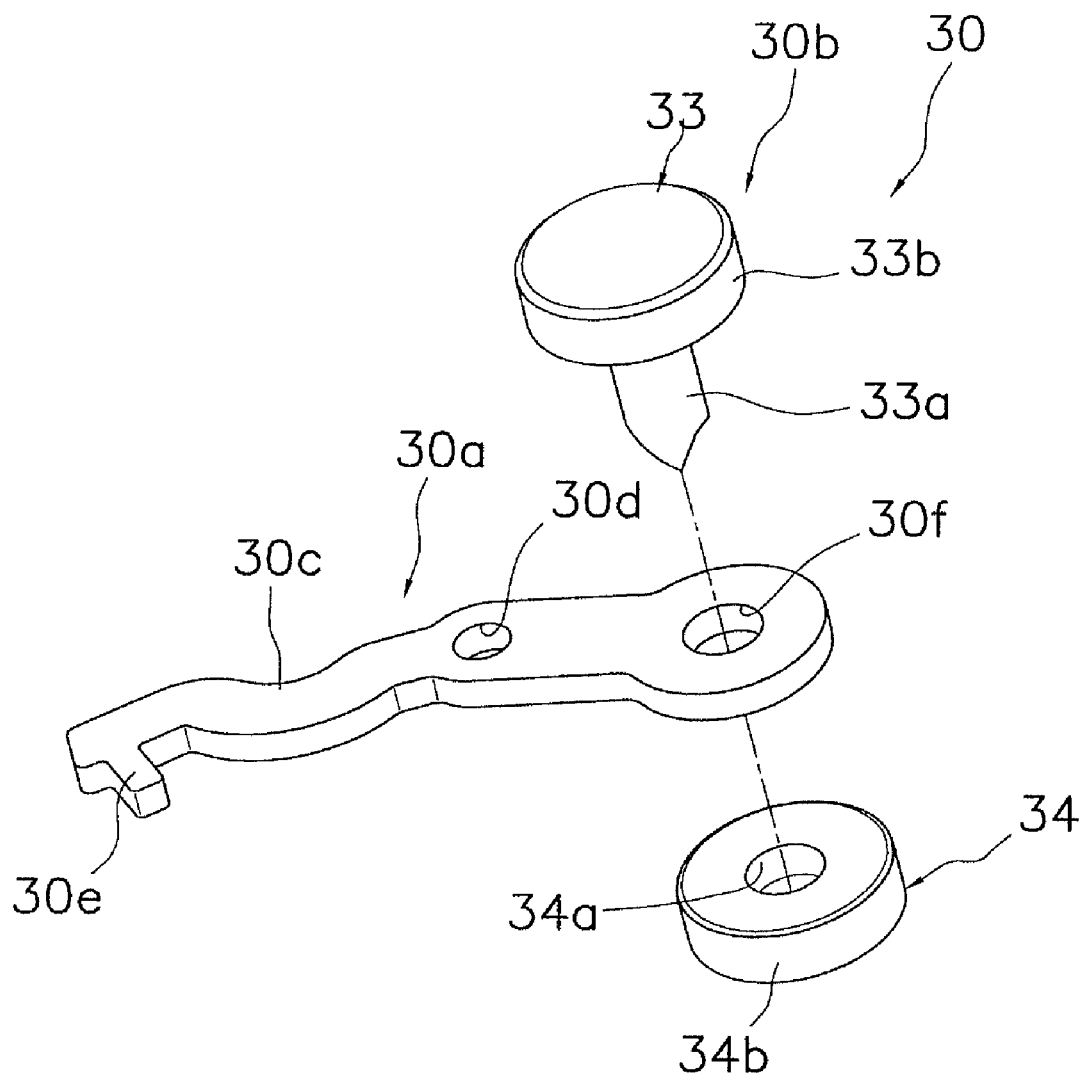
FIG. 5 is an exploded perspective view of a lock member of the speed-change operation mechanism and its periphery.
Figure 6:
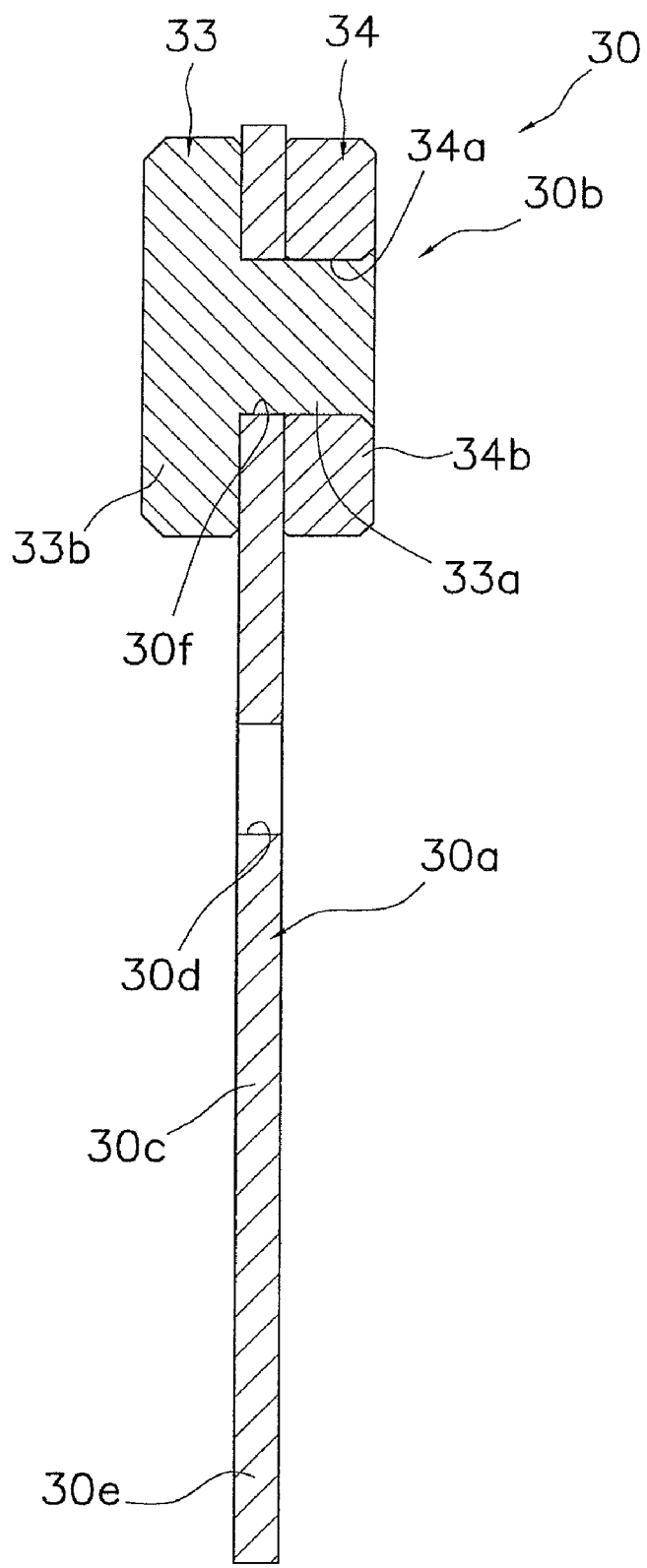
FIG. 6 is a cross-sectional view of the lock member and its periphery.

As illustrated in FIGS. 3 to 6, the pivot operation part 30b includes a first pivot operation portion 33 and a second pivot operation portion 34. The first pivot operation portion 33 is disposed on the front surface of the main body 30a, i.e., a surface opposite the surface facing the handle arm 4a. On the other hand, the second pivot operation portion 34 is disposed on the back surface of the main body 30a, i.e., the surface facing the handle arm 4a. The second pivot operation portion 34 is provided to cover the clearance between the main body 30a and the surface of the handle arm 4a. As illustrated in FIGS. 5 and 6, the main body 30a includes a through hole 30f (third through hole) that passes through an end opposite the base end having the holding portion 30e (front end). The first pivot operation portion 33 includes a shaft portion 33a that passes through the through hole 30f of the main body 30a. The first pivot operation portion 33 further includes a head portion 33b. The head portion 33b has a diameter greater than that of the shaft portion 33a, and has a circular outline. On the other hand, the second pivot operation portion 34 has a through hole 34a. The through hole 34a is used as a recess in which the distal end of the shaft portion 33a of the first pivot operation portion 33 is inserted and fixed therein by caulking. The through hole 34a of the second pivot operation portion 34 has an inner diameter roughly the same as the outer diameter of the shaft portion 33a of the first pivot operation portion 33, but just large enough to accommodate the shaft portion 33a. Further, the second pivot operation portion 34 includes a main body 34b. The main body 34b is an annular member including the through hole 34a in its center part. The main body 34b of the second pivot operation portion 34 has a circular outline. The main body 34b of the second pivot operation portion 34 has an outer diameter roughly the same as that of the head portion 33b of the first pivot operation portion 33. As illustrated in FIG. 3, the second pivot operation portion 34 is provided to close the clearance between the main body 30a and the surface of the handle arm 4a and simultaneously to produce the clearance between the second pivot operation portion 34 and the surface of the handle arm 4a. Quite a small clearance, just enough to allow a pivot operation of the second pivot operation portion 34, is produced between the second pivot operation portion 34 and the surface of the handle arm 4a. As illustrated in FIG. 2, the thickness of the base member 31 from the surface contacting the handle arm 4a to the surface contacting the main body 30a is larger than or equal to the thickness of the second pivot operation portion 34, i.e., the distance between the surface contacting the lock member 30 to the distal end. Further, the thickness of the base member 31 from the surface contacting the handle arm 4a to the surface contacting the main body 30a is less than the sum of the thicknesses of the second pivot operation portion 34 and the thickness of the lock member 30, i.e., the distance between the surface contacting the second pivot portion 34 and the surface contacting the first pivot operation portion 33. More preferably, the thickness of the base member 31 is less than the sum of the thickness of the second pivot operation portion 34 and one tenth the thickness of the lock member 30. Even more preferably, the thickness of the base member 31 is less than the sum of the thickness of the second pivot operation portion 34 and one one-hundredth the thickness of the lock member 30.

As illustrated in FIGS. 3 and 4, the base member 31 is a base on which the pivot shaft 31a is mounted. On the front side of the base member 31, i.e., the side opposite the side facing the handle arm 4a, the main body 30a of the lock member 30 and the spring member 35 functioning as the lock member urging member are disposed in a pivotable state. Further, the base member 31 includes the noncircular hole 31d in its center part. The head portion 29b of the nut member 29 is fitted into the noncircular hole 31d. Thus, the base member 31 functions as a retainer. The noncircular hole 31d is a through hole with a polygonal outline. The head portion 29b with a hexagonal outline is thereby allowed to be engaged with the noncircular hole 31d in any orientation. The base member 31 includes the pivot shaft 31a on the outside of the outline of the noncircular hole 31d. The pivot shaft 31a is raised in an upward direction, i.e., protrudes in a direction perpendicular or substantially perpendicular from a surface of the base member 31 opposite a surface facing the handle arm 4a. The pivot shaft 31a is fitted into the pivot shaft hole 30d that passes through the center part of the main body 30a of the lock member 30. Further, the pivot shaft 31a is provided on the main body 30a in an upwardly raised position perpendicular to the handle arm 4a. The pivot shaft 31a is configured to allow the interlock portion 30c of the lock member 30 to pivot between a direction for interlocking the interlock portion 30c with the interlock target portion 25c of the operation shaft 25 and a direction for releasing the interlock portion 30c from the interlocked state with the interlock target portion 25c of the operation shaft 25. Again, the base member 31 further includes the adjoining portion 31b. The adjoining portion 31b is a wall portion extending in a direction parallel to substantially parallel to the pivot shaft 31a for allowing one end of the spring member 35 functioning as the lock member urging member to make contact. Further, the base member 31 has two through holes 31c for allowing two screw members 32c to be inserted therethrough. The base member 31 is fixed to the surface of the handle arm 4a together with the casing member 32 by the screw members 32c.

As illustrated in FIGS. 2 and 4, the casing member 32 is a cover member fixed to the surface of the handle arm 4a. The casing member 32 covers the operation shaft 25, the lock member 30, the spring member 35 functioning as the lock member urging member, and the base member 31 in a condition in which the press operation portion 25b of the operation shaft 25 and the pivot operation part 30b of the lock member 30 are exposed to the outside. The casing member 32 includes a circular opening 32a and a rectangular side hole 32d. The press operation portion 25b is exposed to the outside through the opening 32a. On the other hand, the pivot operation part 30b is exposed to the outside through the side hole 32d formed on a lateral side of the casing member 32. Further, the casing member 32 has two through holes 32b for allowing the screw members 32c to be inserted therethrough. As described above, the casing member 32 is fixed to the surface of the handle arm 4a through the base member 31 by the screw members 32c.

When the operation shaft 25 is pushed to the leftward in FIG. 2 through a press operation of the press operation portion 25b of the operation shaft 25, the interlock portion 30c of the lock member 30 is interlocked with the interlock target portion 25c of the operation shaft 25. The operation shaft 25 is accordingly set to be in a locked state. When a pivot operation is then performed for the pivot operation part 30b of the lock member 30 under the locked state, the interlock portion 30c of the lock member 30 is released from the interlocked state with the interlock target portion 25c of the operation shaft 25. The operation shaft 25 is thereby set to be in an unlocked state.

According to the speed-change operation mechanism 7 with the foregoing structure, the engaging piece 23 is engaged with the second main gear 19 when the operation shaft 25 is pushed leftward in FIG. 2 by a press operation of the press operation portion 25b of the operation shaft 25. Under this condition, rotation of the handle 4 is delivered to the second pinion gear 22 through the second main gear 19. The spool 3 is accordingly rotated at low speed. On the other hand, the engaging piece 23 is engaged with the first main gear 18 when the operation shaft 25 is pushed rightward in FIG. 2 by an urging force of the first compression spring 24a produced in response to release of the interlock portion 30c (i.e., a curved portion of the lock member 30) from the interlocked state with the interlock target portion 25c (i.e., an annular groove formed on the shaft portion 25a of the operation shaft 25) through a pivot operation of the pivot operation part 30b of the lock member 30. Under this condition, rotation of the handle 4 is delivered to the first pinion gear 21 through the first main gear 18. The spool 3 is accordingly rotated at high speed.

As illustrated in FIG. 2, the lever drag mechanism 9 includes the friction disc 41, the drag disc 42, and a moving mechanism 43. The friction disc 41 is attached to the right end of the spool 3 in FIG. 2. The drag disc 42 is opposed to the friction disc 41. The moving mechanism 43 is configured to reciprocate axially the spool shaft 2.

As illustrated in FIG. 2, the friction disc 41 is a disc washer member made of abrasion-resistant material (e.g., carbon graphite, fiber reinforced resin, etc.). The friction disc 41 is fixed to the outer surface of the right-side flange 3b of the spool 3 by plural attachment bolts. The attachment bolts are herein circumferentially arranged at predetermined intervals.

As illustrated in FIG. 2, the drag disc 42 includes a disc body 45 and a brake disc 46. The disc body 45 is engaged with the first pinion gear 21 and the second pinion gear 22 while being unitarily rotatable with them. The brake disc 46 is fixed to the disc body 45 by plural attachment bolts while being opposed to the friction disc 41. The brake disc 46 is made of, for instance, stainless steel. Again, the disc body 45 is a disc member produced by aluminum die casting. The disc body 45 is supported by the spool shaft 2 through a third bearing 16c in a rotatable state. The brake disc 46 is fixed to the surface of the disc body 45 opposed to the spool 3.

As illustrated in FIG. 2, the moving mechanism 43 includes a drag lever 80, a pull mechanism 81, and the second spring member 17b. The drag lever 80 is attached to the reel body 1 in a pivotable state. The pull mechanism 81 is configured to pull and to move the spool shaft 2 rightward in response to a clockwise pivot of the drag lever 80 in FIG. 1. The second spring member 17b is configured to urge and to move the spool shaft 2 to leftward in FIG. 2 in response to a counter-clockwise movement of the drag lever 80 in FIG. 1.

The drag lever 80 is pivoted for adjusting the magnitude of drag force of the lever drag mechanism 9 in the lever drag reel with the foregoing structure. When the drag lever 80 is set in a drag release position (i.e., the outermost pivot position in the counterclockwise direction in FIG. 1), the friction disc 41 is separated from the drag disc 42 in the lever drag mechanism 9. A drag release state is thus produced, and the spool 3 is set to be in a freely rotatable state. Casting can be performed under this condition. When the drag lever 80 is pivoted in the clockwise direction in FIG. 1, the friction disc 41 is gradually moved in the axial outward direction of the spool shaft 2 (i.e., rightward in FIG. 2) and the spool shaft 2 and spool 3 are gradually moved rightward. Consequently, the friction disc 41 strongly presses the drag disc 42, and drag force is thus increased.

According to the speed-change operation mechanism 7 of the lever drag reel with the foregoing structure, the main body 30a of the lock member 30 is disposed for producing the clearance between the main body 30a and the surface of the handle arm 4a. On the other hand, the pivot operation part 30b of the lock member 30 is disposed for closing the clearance between the main body 30a and the surface of the handle arm 4a and simultaneously for producing the clearance between the pivot operation part 30b and the surface of the handle arm 4a. In this case, a large clearance is produced between the main body 30a of the lock member 30 and the surface of the handle arm 4a, whereas a small clearance, just enough to allow a pivot operation, is produced between the pivot operation part 30b of the lock member 30 and the surface of the handle arm 4a. Further, the pivot operation part 30b of the lock member 30 is herein disposed close to the surface of the handle arm 4a. Therefore, this structure prevents the fishing line from easily getting stuck in the small clearance between the pivot operation part 30b of the lock member 30 and the surface of the handle arm 4a. Further, even if a large force is applied to the main body 30a and the pivot operation part 30b of the lock member 30 in the direction of the handle arm 4a, the pivot operation part 30b, disposed close to the surface of the handle arm 4, makes contact with the surface of the handle arm 4a. Accordingly, the main body 30a of the lock member 30 is prevented from being flexed or deformed. Thus, the foregoing structure prevents the fishing line from easily getting stuck in the clearance between the pivot operation part 30b of the lock member 30 and the surface of the handle arm 4a. Further, the main body 30a and the pivot operation part 30b of the lock member 30 are prevented from being deformed. Therefore, a smooth pivot operation is achieved for the main body 30a and the pivot operation part 30b of the lock member 30.

Other Exemplary Embodiments (a) The foregoing exemplary embodiment has exemplified a medium-sized lever drag reel. However, the present invention is not limited to this. The present invention is applicable to any suitable dual-bearing reel as long as it is provided with the speed-change operation mechanism 7.

(b) In the foregoing exemplary embodiment, the base member 31 includes the pivot shaft 31a whereas the lock member 30 includes the pivot shaft hole 30d for allowing the pivot shaft 31a to be inserted through. However, the lock member 30 may include a pivot shaft whereas the base member 31 may include a pivot shaft hole for allowing the pivot shaft to be inserted through.

(c) In the foregoing exemplary embodiment, the first pivot operation portion 33 is fixed to the second pivot operation portion 34 by means of calking. Alternatively, the second pivot operation portion 34 may be fixed to the first pivot operation portion 33 by calking. Further, the method of fixing the first pivot operation portion 33 to the second pivot operation portion 34 is not limited to calking. For example, the first pivot operation portion 33 may be fixed to the second pivot operation portion 34 by a screw.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms, "including", "having," and their derivatives. Also, the terms "part," "section," "portion," "member," or "element" when used in the singular can have the dual meaning of a single part or a plurality of parts. As used herein to describe the present invention, the following directional terms "forward, rearward, above, downward, vertical, horizontal, below, and transverse" as well as any other similar directional terms refer to those directions of a reel. Accordingly, these terms, as utilized to describe the present invention should be interpreted relative to a reel as normally used. Finally, terms of degree such as "substantially," "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A dual-bearing reel speed-change operation mechanism configured to switch handle rotation between high-speed rotation and low-speed rotation to deliver the handle rotation to a spool, comprising:
    a handle including
        a handle arm having
            a proximal end,
            a distal end opposite the proximal end in a longitudinal direction of the handle arm,
            a first through hole formed in a direction perpendicular to the longitudinal direction, and
        a handle knob attached to a distal end of the handle arm;
    a handle shaft including
        a base end extending into the first through hole of the handle arm and being unitarily rotatable with the handle arm, and
        a second through hole axially passing through the inside of the handle shaft;
    an operation shaft including
        a shaft portion inserted through the second through hole of the handle shaft, the shaft portion having an interlock-target portion on an outer periphery of a base end of the shaft portion, and
        a press operation portion formed on the base end of the shaft portion, the press operation portion having a diameter larger than that of the shaft portion, the press operation portion configured to switch the handle rotation from the high-speed rotation to the low-speed rotation through a press operation;
    an operation shaft urging member configured to urge the operation shaft in an axially outward direction;
    a lock member including
        a main body disposed to have a clearance between the main body and a surface of the handle arm, the main body having an interlock portion on a lateral part of the main body, the interlock portion configured to be interlocked with the interlock target portion of the shaft portion of the operation shaft,
        a pivot shaft extending in the main body perpendicular to the longitudinal direction of the handle arm, the pivot shaft allowing the interlock portion to pivot thereon between a direction to interlock the interlock portion with the interlock-target portion and a direction to release the interlock portion from the interlocked state with the interlock-target portion, and
        a pivot operation part disposed to close a first part of the clearance between the main body and the handle arm while maintaining a second part of the clearance; and
    a lock member urging member urging the lock member towards the operation shaft.

2. The dual-bearing reel speed-change operation mechanism according to claim 1, further comprising
    a base member from which the pivot shaft of the lock member extends,
    wherein
        both the main body of the lock member and the lock member urging member are disposed on a front side of the base member, the main body is pivotable relative to the base member, and the lock member urging member is movable relative to the base member.

3. The dual-bearing reel speed-change operation mechanism according to claim 2, further comprising
    a casing member fixed on the surface of the handle arm, the casing member covering the operation shaft, the lock member, the lock member urging member, and the base member such that the press operation portion and the pivot operation part are exposed outside of the casing.

4. The dual-bearing reel speed-change operation mechanism according to claim 1, wherein
    the pivot operation part is disposed along the surface of the handle arm in a movable state.

5. The dual-bearing reel speed-change operation mechanism according to claim 4, wherein
    the pivot operation part has a roughly circular outline and an outer periphery of the pivot operation part is knurled.

6. The dual-bearing reel speed-change operation mechanism according to claim 1, wherein
    the pivot operation part includes a first pivot operation portion and a second pivot operation portion, the first pivot operation portion is disposed on a front side of the main body opposite a back side facing the handle arm, the second pivot operation portion is disposed on the back side of the main body to close the first clearance between the pivot operation part and the surface of the handle arm.

7. The dual-bearing reel speed-change operation mechanism according to claim 6, wherein
    the main body includes a third through hole passing through a distal end of the main body,
    the first pivot operation portion includes a shaft portion passing through the third through hole of the main body, and
    the second pivot operation portion includes an aperture in which a distal end of the shaft portion of the first pivot operation portion is inserted and fixed in the aperture by caulking.

8. The dual-bearing reel speed-change operation mechanism according to claim 1, wherein
    the interlock-target portion is an interlock groove formed on the outer periphery of the shaft portion, and
    the interlock portion is a curved portion curved in a circular-arc shape to interlock with the interlock groove.

* * * * *